(12) United States Patent
Kim

(10) Patent No.: US 8,029,405 B2
(45) Date of Patent: Oct. 4, 2011

(54) GEAR TRAIN OF AUTOMATIC TRANSMISSION FOR VEHICLES

(75) Inventor: Woo Yeol Kim, Gunpo (KR)

(73) Assignee: Hyundai Motor Company, Seoul (KR)

( * ) Notice: Subject to any disclaimer, the term of this patent is extended or adjusted under 35 U.S.C. 154(b) by 330 days.

(21) Appl. No.: 12/474,006

(22) Filed: May 28, 2009

(65) Prior Publication Data
US 2009/0298639 A1    Dec. 3, 2009

(30) Foreign Application Priority Data

May 30, 2008  (KR) .................. 10-2008-0050610
Jun. 3, 2008   (KR) .................. 10-2008-0052299

(51) Int. Cl.
*F16H 3/44*    (2006.01)
(52) U.S. Cl. ........................................ 475/280
(58) Field of Classification Search .......... 475/275–291, 475/313, 319, 325
See application file for complete search history.

(56) References Cited

U.S. PATENT DOCUMENTS

| | | | | |
|---|---|---|---|---|
| 7,108,629 B2* | 9/2006 | Hiraiwa | ...................... | 475/288 |
| 7,452,303 B2* | 11/2008 | Seo | ...................... | 475/284 |
| 7,618,342 B2* | 11/2009 | Kim | ...................... | 475/287 |
| 7,727,103 B2* | 6/2010 | Seo | ...................... | 475/275 |
| 7,780,566 B2* | 8/2010 | Seo | ...................... | 475/276 |
| 7,846,058 B2* | 12/2010 | Kim | ...................... | 475/280 |
| 7,850,569 B2* | 12/2010 | Seo et al. | ...................... | 475/281 |
| 7,854,678 B2* | 12/2010 | Kim | ...................... | 475/276 |
| 2009/0048062 A1* | 2/2009 | Seo et al. | ...................... | 475/276 |

* cited by examiner

*Primary Examiner* — David D Le
*Assistant Examiner* — Michael Gonzalez
(74) *Attorney, Agent, or Firm* — Morgan, Lewis & Bockius LLP

(57) ABSTRACT

A gear train of an automatic transmission for vehicles has two simple planetary gear sets and one compound planetary gear set with four clutches and three brakes to achieve ten forward speeds and three reverse speeds.

16 Claims, 9 Drawing Sheets

FIG. 2

|      | C1 | C2 | C3 | C4 | B1 | B2 | B3 |
|------|----|----|----|----|----|----|----|
| D1   | ●  |    |    |    | ●  |    |    |
| D2   | ●  |    |    |    |    | ●  |    |
| D3   | ●  |    |    |    |    |    | ●  |
| D4   | ●  | ●  |    |    |    |    |    |
| D5   | ●  |    | ●  |    |    |    |    |
| D6   | ●  |    |    | ●  |    |    |    |
| D7   |    |    | ●  | ●  |    |    |    |
| D8   |    | ●  |    | ●  |    |    |    |
| D9   |    |    |    | ●  |    |    | ●  |
| D10  |    |    |    | ●  |    | ●  |    |
| REV 1|    |    |    |    | ●  |    | ●  |
| REV 2|    | ●  |    |    | ●  |    |    |
| REV 3|    |    | ●  |    | ●  |    |    |

GEAR TRAIN OF AUTOMATIC TRANSMISSION FOR VEHICLES

CROSS-REFERENCE TO RELATED APPLICATION

The present application claims priority to Korean Patent Applications Nos. 10-2008-0050610 and No. 10-2008-0052299 filed respectively on May 30, 2008 and Jun. 3, 2008, the entire contents of which applications are incorporated herein for all purposes by this reference.

BACKGROUND OF THE INVENTION

1. Field of the Invention

The present invention relates to a gear train of an automatic transmission for vehicles which realizes ten forward speeds by combining two simple planetary gear sets and one compound planetary gear set with four clutches and three brakes.

2. Description of Related Art

A typical shift mechanism of an automatic transmission utilizes a combination of a plurality of planetary gear sets. A gear train of such an automatic transmission that includes the plurality of planetary gear sets changes rotation speed and torque received from a torque converter of the automatic transmission, and accordingly transmits the changed torque to an output shaft.

It is well known that when a transmission realizes a greater number of shift speeds, speed ratios of the transmission can be more optimally designed, and therefore a vehicle can have economical fuel mileage and better performance. For that reason, an automatic transmission that is able to realize more shift speeds is under continuous investigation.

In addition, with the same number of speeds, features of a gear train, such as durability, efficiency in power transmission, and size, substantially depend on the layout of the combined planetary gear sets. Therefore, designs for a combining structure of a gear train are also under continuous investigation.

A manual transmission that has too many speeds causes inconvenience to a driver. Therefore, the advantageous features of having more shift-speeds are more important in an automatic transmission because an automatic transmission automatically controls the shifting operations.

Currently, four-speed and five-speed automatic transmissions are most often found on the market. However, six-speed automatic transmissions have also been realized for enhancement of performance of power transmission and for enhanced fuel mileage of a vehicle. In addition, seven-speed automatic transmissions and eight-speed automatic transmissions have been developed at a good pace.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a gear train of an automatic transmission for vehicles having advantages of improving power delivery performance and shifting performance to the reverse speed and reducing fuel consumption as a consequence of combining two simple planetary gear sets and one compound planetary gear set with four clutches and three brakes.

In an aspect of the present invention, a gear train of an automatic transmission for vehicles may include a first planetary gear set including a first rotation element always operating as a fixed element, a second rotation element forming a first intermediate output pathway which always outputs a reduced rotation speed, and a third rotation element forming an input pathway which is connected to an input shaft and forming a second intermediate output pathway which outputs a rotation speed of the input shaft, a second planetary gear set including a fourth rotation element forming a first intermediate input pathway directly connected to the first intermediate output pathway, a fifth rotation element forming a third intermediate output pathway and operating as a selective fixed element, and a sixth rotation element operating as a selective fixed element, wherein two rotation elements of the fourth, fifth, and sixth rotation elements are selectively connected such that the second planetary gear set becomes a direct-coupling state, and one of the fifth and sixth rotation elements forms a first variable input pathway which is selectively connected to the second intermediate output pathway, a third planetary gear set configured to include seventh, eighth, ninth, and tenth rotation elements by combining two planetary gear sets, wherein the seventh rotation element forms a second intermediate input pathway which is directly connected to the third intermediate output pathway, the tenth rotation element forms a second variable input pathway which is selectively connected to the first intermediate output pathway, the eighth rotation element forms a third variable input pathway which is selectively connected to the input shaft and operates as a selective fixed element, and the ninth rotation element forms a final output pathway which is connected to an output shaft, and a friction member including a plurality of clutches disposed for selective connections of the first, second, and third variable input pathways and a selective direct-coupling of the second planetary gear set, and a plurality of brakes disposed between the rotation elements operating as the fixed element and a transmission housing.

The first rotation element may be fixed to the transmission housing.

The friction member may include a first clutch disposed on the second variable input pathway, a second clutch disposed for the selective direct-coupling of the second planetary gear set, a third clutch disposed on the first variable input pathway, a fourth clutch disposed on the third variable input pathway, a first brake selectively stopping the eighth rotation element, a second brake selectively stopping one of the fifth rotation element and the sixth rotation element, and a third brake selectively stopping the other of the fifth rotation element and the sixth rotation element.

In another aspects of the present invention, the first planetary gear set may be a double pinion planetary gear set having a first sun gear of the first rotation element, a first ring gear of the second rotation element, and a first planet carrier of the third rotation element as rotation elements thereof, the second planetary gear set may be a single pinion planetary gear set having a second sun gear of the fourth rotation element, a second planet carrier of the fifth rotation element, and a second ring gear of the sixth rotation element as rotation elements thereof, and the third planetary gear set may be a Ravigneaux planetary gear set formed by combining a single pinion planetary gear set and a double pinion planetary gear set and sharing a ring gear and a planet carrier, and having a third sun gear of the seventh rotation element engaged with a long pinion, a third planet carrier of the eighth rotation element, a third ring gear of the ninth rotation element, and a fourth sun gear of the tenth rotation element engaged with a short pinion as rotation elements thereof.

In further another aspects of the present invention, the first clutch and the first brake may be operated at a first forward speed, the first clutch and the second brake may be operated at a second forward speed, the first clutch and the third brake may be operated at a third forward speed, the first and second clutches may be operated at a fourth forward speed, the first and third clutches may be operated at a fifth forward speed, the first and fourth clutches may be operated at a sixth forward speed, the third and fourth clutches may be operated at a seventh forward speed, the second and fourth clutches may be operated at an eighth forward speed, the fourth clutch and the third brake may be operated at a ninth forward speed, the fourth clutch and the second brake may be operated at a tenth forward speed, the first and third brakes may be operated at a first reverse speed, the second clutch and the first brake may be operated at a second reverse speed, and the third clutch and the first brake may be operated at a third reverse speed.

In addition, the second clutch may be disposed between the fourth rotation element and the fifth rotation element, between the fourth rotation element and the sixth rotation element, or between the fifth rotation element and the sixth rotation element.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is an operational chart for an exemplary gear train according to the present invention.

DETAILED DESCRIPTION OF THE INVENTION

Figure 1:
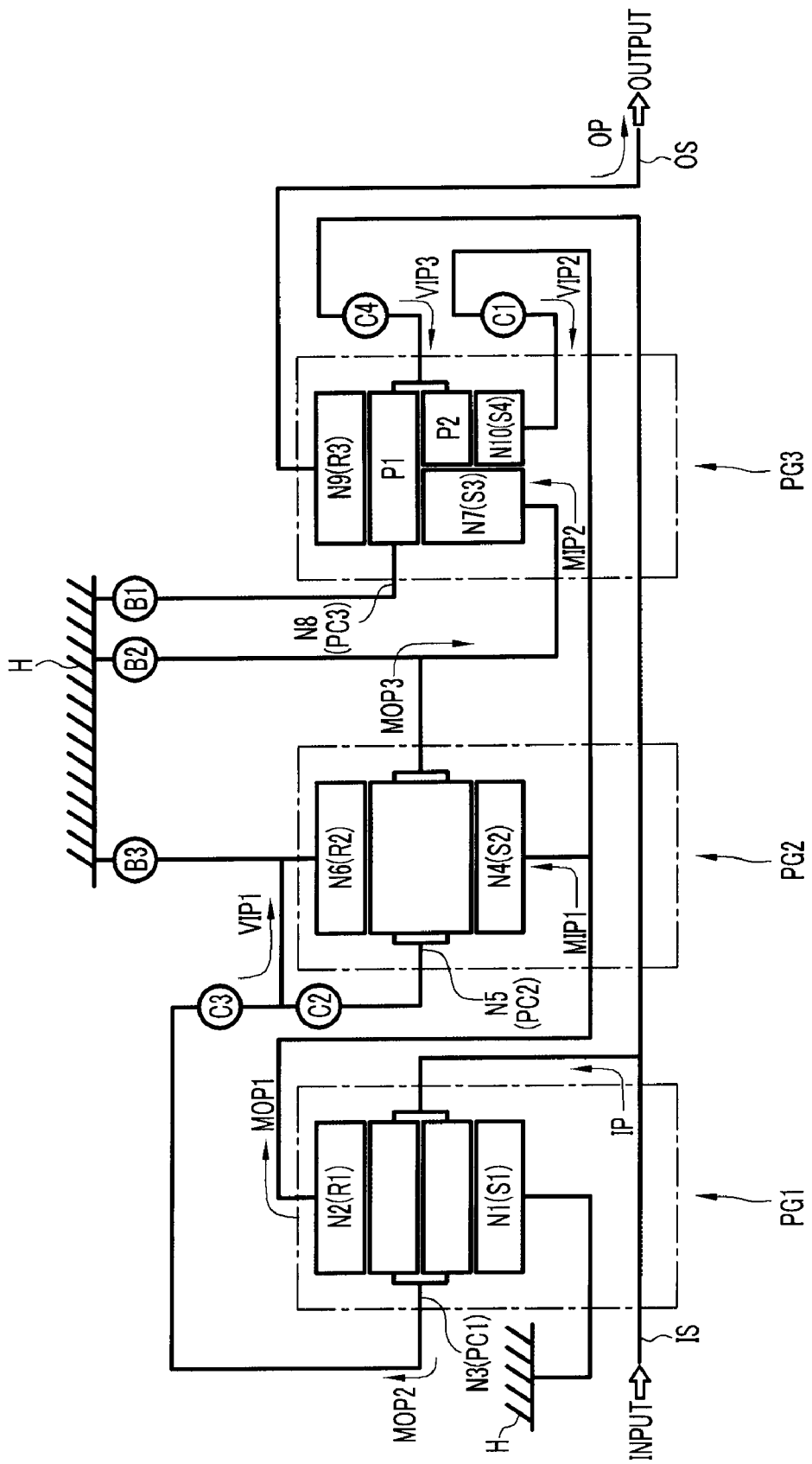
FIG. 1 is a schematic diagram of an exemplary gear train according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The gear train includes first, second, and third planetary gear sets PG1, PG2, and PG3 disposed on the same axis, clutch means consisting of first, second, third, and fourth clutches C1, C2, C3, and C4, and brake means consisting of first, second, and third brakes B1, B2, and B3.

A rotation speed input from an input shaft IS to the first, second, and third planetary gear sets PG1, PG2, and PG3 is changed and is output through an output shaft OS. The first planetary gear set PG1 is disposed close to an engine, and the second and third planetary gear sets PG2 and PG3 are sequentially disposed at the rear of the first planetary gear set PG1.

The input shaft IS is an input member and represents a turbine shaft of a torque converter. Therefore, torque transmitted from a crankshaft of the engine to the torque converter is converted and then input to the gear train through the turbine shaft. The output shaft OS is an output member, and a rotation speed changed in the gear train is transmitted to a well-known differential apparatus through an output gear (not shown) and is finally transmitted to a drive wheel.

The first planetary gear set PG1 is a double pinion planetary gear set, and has three rotation elements consisting of a sun gear, a planet carrier, and a ring gear. For better comprehension and ease of description, the sun gear of the first planetary gear set PG1 is indicated by a first sun gear S1, the planet carrier of the first planetary gear set PG1 is indicated by a first planet carrier PC1, and the ring gear of the first planetary gear set PG1 is indicated by a first ring gear R1.

In addition, the first sun gear S1 is fixedly connected to a transmission housing H, and the first planet carrier PC1 is directly connected to the input shaft IS in the first planetary gear set PG1.

The first sun gear S1 of a first rotation element N1 is fixedly connected to the transmission housing H and is always operated as a fixed element. The first ring gear R1 of a second rotation element N2 forms a first intermediate output pathway MOP1 and is always operated as an output element that always outputs a reduced rotation speed. The first planet carrier PC1 of the third rotation element N3 is directly connected to the input shaft IS so as to form an input pathway IP and forms a second intermediate output pathway MOP2 that outputs the rotation speed of the input shaft IS as it is.

The second planetary gear set PG2 is a single pinion planetary gear set, and has three rotation elements consisting of a sun gear, a planet carrier, and a ring gear. For better comprehension and ease of description, the sun gear of the second planetary gear set PG2 is indicated by a second sun gear S2, the planet carrier of the second planetary gear set PG2 is indicated by a second planet carrier PC2, and the ring gear of the second planetary gear set PG2 is indicated by a second ring gear R2.

In addition, the second sun gear S2 is directly connected to the first ring gear R1, and the second ring gear R2 is selectively connected to the first planet carrier PC1 in the second planetary gear set PG2.

The second sun gear S2 of a fourth rotation element N4 forms a first intermediate input pathway MIP1 that is directly connected to the first intermediate output pathway MOP1 of the second rotation element N2, the second planet carrier PC2 of a fifth rotation element N5 forms a third intermediate output pathway MOP3 and is operated as a selective fixed element, and the second ring gear R2 of a sixth rotation element N6 forms a first variable input pathway VIP1 that is selectively connected to the second intermediate output pathway MOP2 of the third rotation element N3 and is operated as a selective fixed element.

The third clutch C3 is disposed on the first variable input pathway VIP1 and torque of the first planet carrier PC1 is selectively transmitted to the second ring gear R2 by an operation of the third clutch C3.

In addition, the second planet carrier PC2 of the fifth rotation element N5 and the second ring gear R2 of the sixth rotation element N6 are selectively connected to the transmission housing H and are operated as the selective fixed element, respectively. For this purpose, the second brake B2 is disposed between the second planet carrier PC2 and the transmission housing H, and the third brake B3 is disposed between the second ring gear R2 and the transmission housing H.

In addition, the gear train includes the second clutch C2 that selectively connects two rotation elements of the second planetary gear set PG2 with each other such that the second planetary gear set PG2 becomes a direct-coupling state selectively. According to the various embodiments of the present invention, the second clutch C2 is disposed between the second ring gear R2 and the second planet carrier PC2. Therefore, if the second clutch C2 is operated, all rotation elements of the second planetary gear set PG2 rotate with the same rotation speed.

The third planetary gear set PG3 is a Ravigneaux planetary gear set in which a single pinion planetary gear set and a double pinion planetary gear set are combined by owning a ring gear and a planet carrier jointly.

The third planetary gear set PG3 includes a ring gear, a planet carrier, and two sun gears as rotation elements thereof. For better comprehension and ease of description, the ring gear of the third planetary gear set PG3 is indicated by a third ring gear R3, the planet carrier of the third planetary gear set PG3 is indicated by a third planet carrier PC3, the sun gear engaged with a long pinion P1 of the third planetary gear set PG3 is indicated by a third sun gear S3, the sun gear engaged with a short pinion P2 of the third planetary gear set PG3 is indicated by a fourth sun gear S4.

The third sun gear S3 of a seventh rotation element N7 is directly connected to the third intermediate output pathway MOP3 of the second planet carrier PC2 through the second intermediate input pathway MIP2, and, together with the second planet carrier PC2, is selectively connected to the transmission housing H through the second brake B2.

The fourth sun gear S4 forms a second variable input pathway VIP2 that is selectively connected to the first intermediate output pathway MOP1.

The third planet carrier PC3 of an eighth rotation element N8 forms a third variable input pathway VIP3 that is selectively connected to the input shaft IS, and is selectively connected to the transmission housing H so as to operate as a selective fixed element. The third ring gear R3 of a ninth rotation element N9 forms a final output pathway OP that is directly connected to the output shaft OS.

The fourth sun gear S4 operates as a tenth rotation element N10.

The first clutch C1 is disposed on the second variable input pathway VIP2 and the torque of the first ring gear R1 is selectively transmitted to the fourth sun gear S4 by an operation of the first clutch C1. The fourth clutch C4 is disposed on the third variable input pathway VIP3 and the torque of the input shaft IS is selectively transmitted to the third planet carrier PC3 by an operation of the fourth clutch C4.

In addition, the third planet carrier PC3 operates as the selective fixed element, and for this purpose, the first brake B1 is disposed between the third planet carrier PC3 and the transmission housing H.

The torque of the engine transmitted through the input shaft IS is changed into ten forward speeds and third reverse speeds by passing through the first, second, and third planetary gear sets PG1, PG2, and PG3. The ten forward speeds and the third reverse speeds are output through the output shaft OS connected to the final output pathway OP.

The friction elements consisting of the first, second, third, and fourth clutches C1, C2, C3, and C4 and the first, second, and third brakes B1, B2, and B3 are conventional multi-plate friction elements of wet type that are operated by hydraulic pressure.

In addition, the second and third clutches C2 and C3 are disposed between the first planetary gear set PG1 and the second planetary gear set PG2, the third brake B3 is disposed at an external circumferential portion of the second planetary gear set PG2, the first and second brakes B1 and B2 are disposed between the second and third planetary gear sets PG2 and PG3, and the first and fourth clutches C1 and C4 are disposed at a rear portion of the third planetary gear set PG3 (farthest from the engine).

If the friction elements are dispersed as described above, formation of hydraulic lines for supplying hydraulic pressure to such friction elements may be simplified, and weight balance in the automatic transmission may be enhanced.

FIG. 2 is an operational chart that shows friction elements (clutches and brakes) operated at each shift speed for various embodiments of the present invention. According to various embodiments of the present invention, two friction elements are operated so as to achieve shifting at each shift speed.

That is, the first clutch C1 and the first brake B1 are operated at a first forward speed D1, the first clutch C1 and the second brake B2 are operated at a second forward speed D2, the first clutch C1 and the third brake B3 are operated at a third forward speed D3, the first and second clutches C1 and C2 are operated at a fourth forward speed D4, the first and third clutches C1 and C3 are operated at a fifth forward speed D5, the first and fourth clutches C1 and C4 are operated at a sixth forward speed D6, the third and fourth clutches C3 and C4 are operated at a seventh forward speed D7, the second and fourth clutches C2 and C4 are operated at an eighth forward speed D8, the fourth clutch C4 and the third brake B3 are operated at a ninth forward speed D9, the fourth clutch C4 and the second brake B2 are operated at a tenth forward speed D10, the first brake B1 and the third brake B3 are operated at a first reverse speed REV1, the second clutch C2 and the first brake B1 are operated at a second reverse speed REV2, and the third clutch C3 and the first brake B1 are operated at a third reverse speed REV3.

Figure 3:
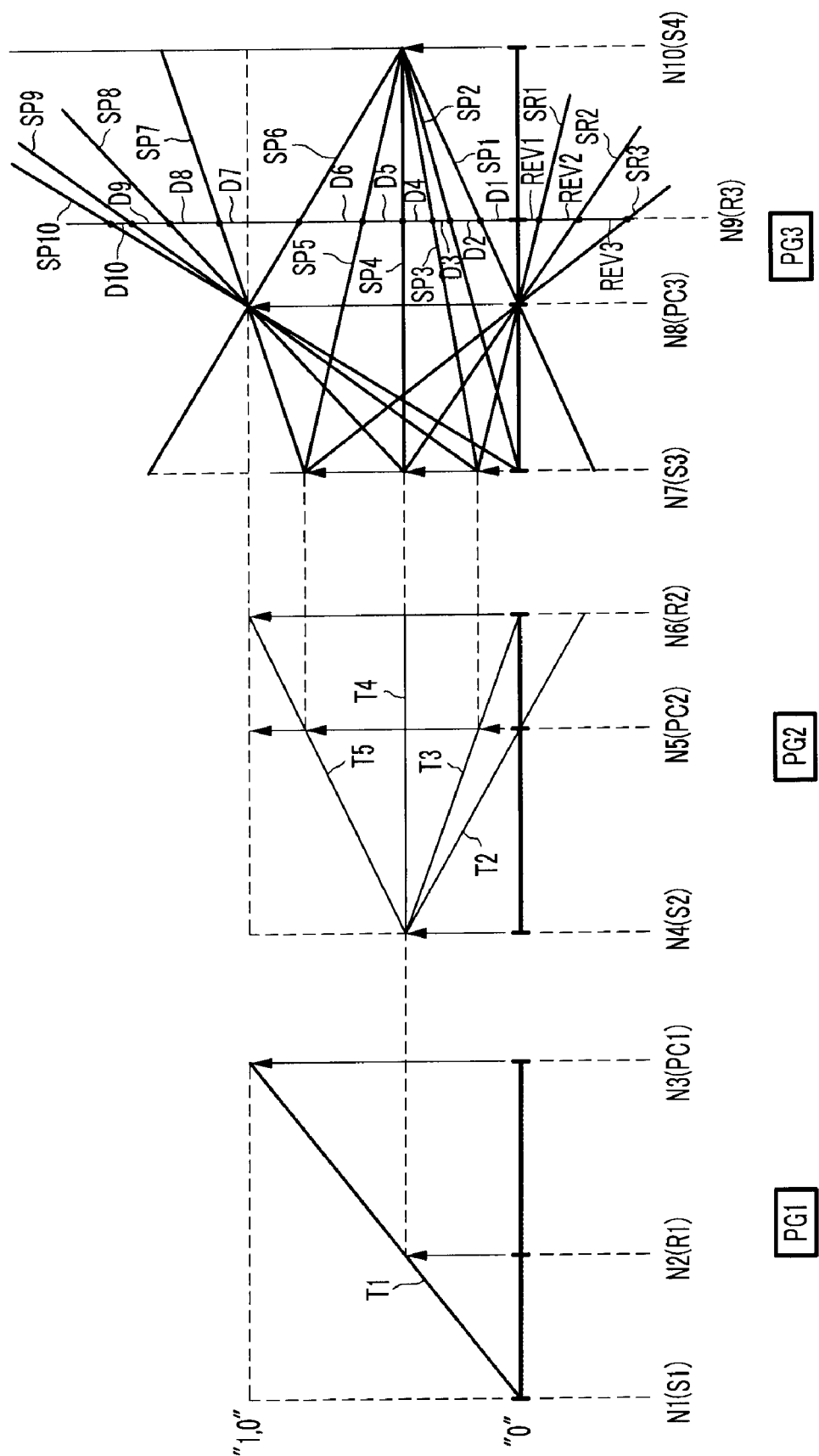
FIG. 3 is a lever diagram for an exemplary gear train according to the present invention.

FIG. 3 is a lever diagram for a gear train according to various embodiments of the present invention. In the drawings, a lower horizontal line represents a rotation speed is "0", and an upper horizontal line represents a rotation speed is "1.0", that is, the rotation speed thereof is the same as that of the input shaft IS.

Three vertical lines of the first planetary gear set PG1 in the drawings represent the first sun gear S1 of the first rotation element N1, the first ring gear R1 of the second rotation element N2, and the first planet carrier PC1 of the third rotation element N3 sequentially from the left, and distances therebetween are set according to a gear ratio of the first planetary gear set PG1 (teeth number of the sun gear/teeth number of the ring gear).

Three vertical lines of the second planetary gear set PG2 in the drawings represent the second sun gear S2 of the fourth rotation element N4, the second planet carrier PC2 of the fifth rotation element N5, and the second ring gear R2 of the sixth rotation element N6 sequentially from the left, and distances therebetween are set according to a gear ratio of the second planetary gear set PG2 (teeth number of the sun gear/teeth number of the ring gear).

Four vertical lines of the third planetary gear set PG3 in the drawings represent the third sun gear S3 of the seventh rotation element N7, the third planet carrier PC3 of the eighth rotation element N8, the third ring gear R3 of the ninth rotation element N9, and the fourth sun gear S4 of the tenth rotation element N10 sequentially from the left, and distances therebetween are set according to a gear ratio of the third planetary gear set PG3 (teeth number of the sun gear/teeth number of the ring gear).

Position of each rotation element in the lever diagram is well known to a person of an ordinary skill in the art who designs a gear train, and thus detailed description will be omitted.

First Forward Speed

At the first forward speed D1, the first clutch C1 and the first brake B1 are operated, as shown in FIG. 2.

Accordingly, in a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form a first speed line T1, and the reduced rotation speed is output through the second rotation element N2 forming the first intermediate output pathway MOP1.

Torque of the first intermediate output pathway MOP1 is transmitted to the second planetary gear set PG2 through the fourth rotation element N4 forming the first intermediate input pathway MIP1, and is transmitted to the fourth sun gear S4 of the tenth rotation element N10 forming the second variable input pathway VIP2 by the operation of the first clutch C1.

In a state that the torque of the first intermediate output pathway MOP1 is input to the tenth rotation element N10, the eighth rotation element N8 operates as the fixed element by the operation of the first brake B1. Therefore, the rotation elements of the third planetary gear set PG3 form a first shift line SP1, and the first forward speed D1 where the first shift line SP1 and the vertical line of the ninth rotation element N9 intersect is output.

At this time, the torque of the first intermediate output pathway MOP1 is transmitted to the second planetary gear set PG2 through the fourth rotation element N4, but has no effect on a shift process.

Second Forward Speed

At the second forward speed D2, the first brake B1 is released and the second brake B2 is operated in a state of the first forward speed D1.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

Torque of the first intermediate output pathway MOP1 is transmitted to the second planetary gear set PG2 through the fourth rotation element N4 forming the first intermediate input pathway MIP1, and is transmitted to the fourth sun gear S4 of the tenth rotation element N10 forming the second variable input pathway VIP2 by the operation of the first clutch C1. At this state, the seventh rotation element N7 operates as the fixed element by the operation of the second brake B2. Therefore, the rotation elements of the third planetary gear set PG3 form a second shift line SP2, and the second forward speed D2 where the second shift line SP2 and the vertical line of the ninth rotation element N9 intersect is output.

At this time, in a state that the torque of the first intermediate output pathway MOP1 is transmitted to the second planetary gear set PG2 through the fourth rotation element N4, the second brake B2 is operated. Therefore, the rotation elements of the second planetary gear set PG2 form a second speed line T2, but has no effect on the shift process.

Third Forward Speed

At the third forward speed D3, the second brake B2 is released and the third brake B3 is operated in a state of the second forward speed D2, as shown in FIG. 2.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

Torque of the first intermediate output pathway MOP1 is transmitted to the second planetary gear set PG2 through the fourth rotation element N4 forming the first intermediate input pathway MIP1, and is transmitted to the tenth rotation element N10 forming the second variable input pathway VIP2 by the operation of the first clutch C1.

At this time, in a state that the torque of the first intermediate output pathway MOP1 is input to the fourth rotation element N4 in the second planetary gear set PG2, the sixth rotation element N6 operates as the fixed element by the operation of the third brake B3. Therefore, the rotation elements of the second planetary gear set PG2 form a third speed line T3 and the torque of the fifth rotation element N5 is input to the third sun gear S3 of the seventh rotation element N7 through the third intermediate output pathway MOP3 and the second intermediate input pathway MIP2.

The torques with different rotation speeds are input respectively to the seventh rotation element N7 and the tenth rotation element N10 in the third planetary gear set PG3. The rotation elements of the third planetary gear set PG3 form a third shift line SP3, and the third forward speed D3 where the third shift line SP3 and the vertical line of the ninth rotation element N9 intersect is output.

Fourth Forward Speed

At the fourth forward speed D4, the third brake B3 is released and the second clutch C2 is operated in a state of the third forward speed D3, as shown in FIG. 2.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

Torque of the first intermediate output pathway MOP1 is transmitted to the second planetary gear set PG2 through the fourth rotation element N4 forming the first intermediate input pathway MIP1, and is transmitted to the fourth sun gear S4 of the tenth rotation element N10 forming the second variable input pathway VIP2 by the operation of the first clutch C1.

In a state that the torque of the first intermediate output pathway MOP1 is input to the fourth rotation element N4, the second planetary gear set PG2 becomes the direct-coupling state by the operation of the second clutch C2. Therefore, the rotation elements of the second planetary gear set PG2 form a fourth speed line T4 and torque of the fifth rotation element N5 forming the third intermediate output pathway MOP3 is input to the seventh rotation element N7 through the second intermediate input pathway MIP2.

In a state that the torque of the first intermediate output pathway MOP1 is input to the tenth rotation element N10, the same rotation speed of the first intermediate output pathway MOP1 is input to the seventh rotation element N7 in the third planetary gear set PG3. Therefore, the third planetary gear set PG3 becomes the direct-coupling state and rotation elements thereof form a fourth shift line SP4. Therefore, the fourth forward speed D4 where the fourth shift line SP4 and the vertical line of the ninth rotation element N9 intersect is output.

Fifth Forward Speed

At the fifth forward speed D5, the second clutch C2 is released and the third clutch C3 is operated in a state of the fourth forward speed D4, as shown in FIG. 2.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

Torque of the first intermediate output pathway MOP1 is transmitted to the second planetary gear set PG2 through the fourth rotation element N4 forming the first intermediate input pathway MIP1, and is transmitted to the fourth sun gear S4 of the tenth rotation element N10 forming the second variable input pathway VIP2 by the operation of the first clutch C1.

At this time, the torque of the input shaft IS is input to the sixth rotation element N6 through the first variable input pathway VIP1 by the operation of the third clutch C3, the rotation elements of the second planetary gear set PG2 form a fifth speed line T5 and the torque of the fifth rotation element N5 forming the third intermediate output pathway MOP3 is transmitted to the seventh rotation element N7.

In a state that the torque of the first intermediate output pathway MOP1 is input to the tenth rotation element N10, the torque of the third intermediate output pathway MOP3 is input to the seventh rotation element N7 in the third planetary gear set PG3. Therefore, the rotation elements of the third planetary gear set PG3 form a fifth shift line SP5, and the fifth forward speed D5 where the fifth shift line SP5 and the vertical line of the ninth rotation element N9 intersect is output.

Sixth Forward Speed

At the sixth forward speed D6, the third clutch C3 is released and the fourth clutch C4 is operated in a state of the fifth forward speed D5, as shown in FIG. 2.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

Torque of the first intermediate output pathway MOP1 is transmitted to the second planetary gear set PG2 through the fourth rotation element N4 forming the first intermediate input pathway MIP1, and is transmitted to the fourth sun gear S4 of the tenth rotation element N10 forming the second variable input pathway VIP2 by the operation of the first clutch C1.

In a state that the torque of the first intermediate output pathway MOP1 is input to the tenth rotation element N10, the torque of the input shaft IS is input to the eighth rotation element N8 through the third variable input pathway VIP3 by the operation of the fourth clutch C4 in the third planetary gear set PG3. Therefore, the rotation elements of the third planetary gear set PG3 form a sixth shift line SP6, and the sixth forward speed D6 where the sixth shift line SP6 and the vertical line of the ninth rotation element N9 intersect is output.

At this time, the torque of the first intermediate output pathway MOP1 is transmitted to the second planetary gear set PG2 through the fourth rotation element N4, but has no effect on a shift process.

Seventh Forward Speed

At the seventh forward speed D7, the first clutch C1 is released and the third clutch C3 is operated in a state of the sixth forward speed D6, as shown in FIG. 2.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

Torque of the first intermediate output pathway MOP1 is transmitted to the second planetary gear set PG2 through the fourth rotation element N4 forming the first intermediate input pathway MIP1, the torque of the input shaft IS is input to the sixth rotation element N6 through the first variable input pathway VIP1 by the operation of the third clutch C3. Therefore, the rotation elements of the second planetary gear set PG2 form the fifth speed line T5, and the torque of the fifth rotation element N5 forming the third intermediate output pathway MOP3 is transmitted to the seventh rotation element N7.

Since the torque of the input pathway IP is input to the eighth rotation element N8 by the operation of the fourth clutch C4, the rotation elements of the third planetary gear set PG3 form a seventh shift line SP7, and the seventh forward speed D7 where the seventh shift line SP7 and the vertical line of the ninth rotation element N9 intersect is output.

Eighth Forward Speed

At the eighth forward speed D8, the third clutch C3 is released and the second clutch C2 is operated in a state of the seventh forward speed D7, as shown in FIG. 2.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

Torque of the first intermediate output pathway MOP1 is transmitted to the second planetary gear set PG2 through the fourth rotation element N4 forming the first intermediate input pathway MIP1, and the second planetary gear set PG2 becomes the direct-coupling state by the operation of the second clutch C2. Therefore, the rotation elements of the second planetary gear set PG2 form the fourth speed line T4, and the torque of the fifth rotation element N5 forming the third intermediate output pathway MOP3 is input to the seventh rotation element N7 through the second intermediate input pathway MIP2.

The torque of the input pathway IP is input to the eighth rotation element N8 by the operation of the fourth clutch C4 in the third planetary gear set PG3. Therefore, the rotation elements of the third planetary gear set PG3 form an eighth shift line SP8, and the eighth forward speed D8 where the eighth shift line SP8 and the vertical line of the ninth rotation element N9 intersect is output.

Ninth Forward Speed

At the ninth forward speed D9, the second clutch C2 is released and the third brake B3 is operated in a state of the eighth forward speed D8, as shown in FIG. 2.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

Torque of the first intermediate output pathway MOP1 is transmitted to the second planetary gear set PG2 through the fourth rotation element N4 forming the first intermediate input pathway MIP1, and the sixth rotation element N6 operates as the fixed element by the operation of the third brake B3. Therefore, the rotation elements of the second planetary gear set PG2 form the third speed line T3. Therefore, a reduced rotation speed of the fifth rotation element N5 is input to the third sun gear S3 of the seventh rotation element N7 through the third intermediate output pathway MOP3 and the second intermediate input pathway MIP2.

In a state that the reduced rotation speed of the fifth rotation element N5 is input to the seventh rotation element N7, the torque of the input shaft IS is input to the eighth rotation element N8 by the operation of the fourth clutch C4 in the third planetary gear set PG3. Therefore, the rotation elements of the third planetary gear set PG3 form a ninth shift line SP9, and the ninth forward speed D9 where the ninth shift line SP9 and the vertical line of the ninth rotation element N9 intersect is output.

Tenth Forward Speed

At the tenth forward speed D10, the third brake B3 is released and the second brake B2 is operated in a state of the ninth forward speed D9, as shown in FIG. 2.

In a state that the torque of the input shaft IS is input to the eighth rotation element N8 by the operation of the fourth clutch C4 in the third planetary gear set PG3, the seventh rotation element N7 operates as the fixed element by the operation of the second brake B2. Therefore, the rotation elements of the third planetary gear set PG3 form a tenth shift line SP10, and the tenth forward speed D10 where the tenth shift line SP10 and the vertical line of the ninth rotation element N9 intersect is output.

First Reverse Speed

At the first reverse speed REV1, the first brake B1 and the third brake B3 are operated, as shown in FIG. 2.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

In a state that the torque of the first intermediate output pathway MOP1 is transmitted to the second planetary gear set PG2 through the fourth rotation element N4 forming the first intermediate input pathway MIP1, the sixth rotation element N6 operates as the fixed element by the operation of the third brake B3. Therefore, the rotation elements of the second planetary gear set PG2 form the third speed line T3, and the reduced rotation speed of the fifth rotation element N5 is input to the third sun gear S3 of the seventh rotation element N7 through the third intermediate output pathway MOP3 and the second intermediate input pathway MIP2.

In a state that the reduced rotation speed of the fifth rotation element N5 is input to the seventh rotation element N7, the eighth rotation element N8 operates as the fixed element by the operation of the first brake B1 in the third planetary gear set PG3. Therefore, the rotation elements of the third planetary gear set PG3 form a first reverse shift line SR1, and the first reverse speed REV1 where the first reverse shift line SR1 and the vertical line of the ninth rotation element N9 intersect is output.

Second Reverse Speed

At the second reverse speed REV2, the third brake B3 is released and the second clutch C2 is operated in a state of the first reverse speed REV1, as shown in FIG. 2.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

The torque of the first intermediate output pathway MOP1 is transmitted to the second planetary gear set PG2 through the fourth rotation element N4 forming the first intermediate input pathway MIP1, and the second planetary gear set PG2 becomes the direct-coupling state by the operation of the second clutch C2. Therefore, the rotation elements of the second planetary gear set PG2 form the fourth speed line T4, and the torque of the fifth rotation element N5 forming the third intermediate output pathway MOP3 is input to the seventh rotation element N7 through the second intermediate input pathway MIP2.

In a state that the torque of the fifth rotation element N5 is input to the seventh rotation element N7, the eighth rotation element N8 operates as the fixed element by the operation of the first brake B1. Therefore, the rotation elements of the third planetary gear set PG3 form a second reverse shift line SR2, and the second reverse speed REV2 where the second reverse shift line SR2 and the vertical line of the ninth rotation element N9 intersect is output.

Third Reverse Speed

At the third reverse speed REV3, the second clutch C2 is released and the third clutch C3 is operated in a state of the second reverse speed REV2, as shown in FIG. 2.

In a state that the torque of the input shaft IS is input to the third rotation element N3 that forms the input pathway IP, the first rotation element N1 is operated as the fixed element in the first planetary gear set PG1. Therefore, the rotation elements of the first planetary gear set PG1 form the first speed line T1, and the reduced rotation speed is output through the second rotation element N2 forming the first intermediate output pathway MOP1.

In a state that the torque of the first intermediate output pathway MOP1 is transmitted to the second planetary gear set PG2 through the fourth rotation element N4 forming the first intermediate input pathway MIP1, the torque of the input shaft IS is input to the sixth rotation element N6 through the first variable input pathway VIP1 by the operation of the third clutch C3. Therefore, the rotation elements of the second planetary gear set PG2 form the fifth speed line T5, and the torque of the fifth rotation element N5 forming the third intermediate output pathway MOP3 is transmitted to the seventh rotation element N7.

In a state that the torque of the fifth rotation element N5 is input to the seventh rotation element N7, the eighth rotation element N8 operates as the fixed element by the operation of the first brake B1. Therefore, the rotation elements of the third planetary gear set PG3 form a third reverse shift line SR3, and the third reverse speed REV3 where the third reverse shift line SR3 and the vertical line of the ninth rotation element N9 intersect is output.

Figure 4:
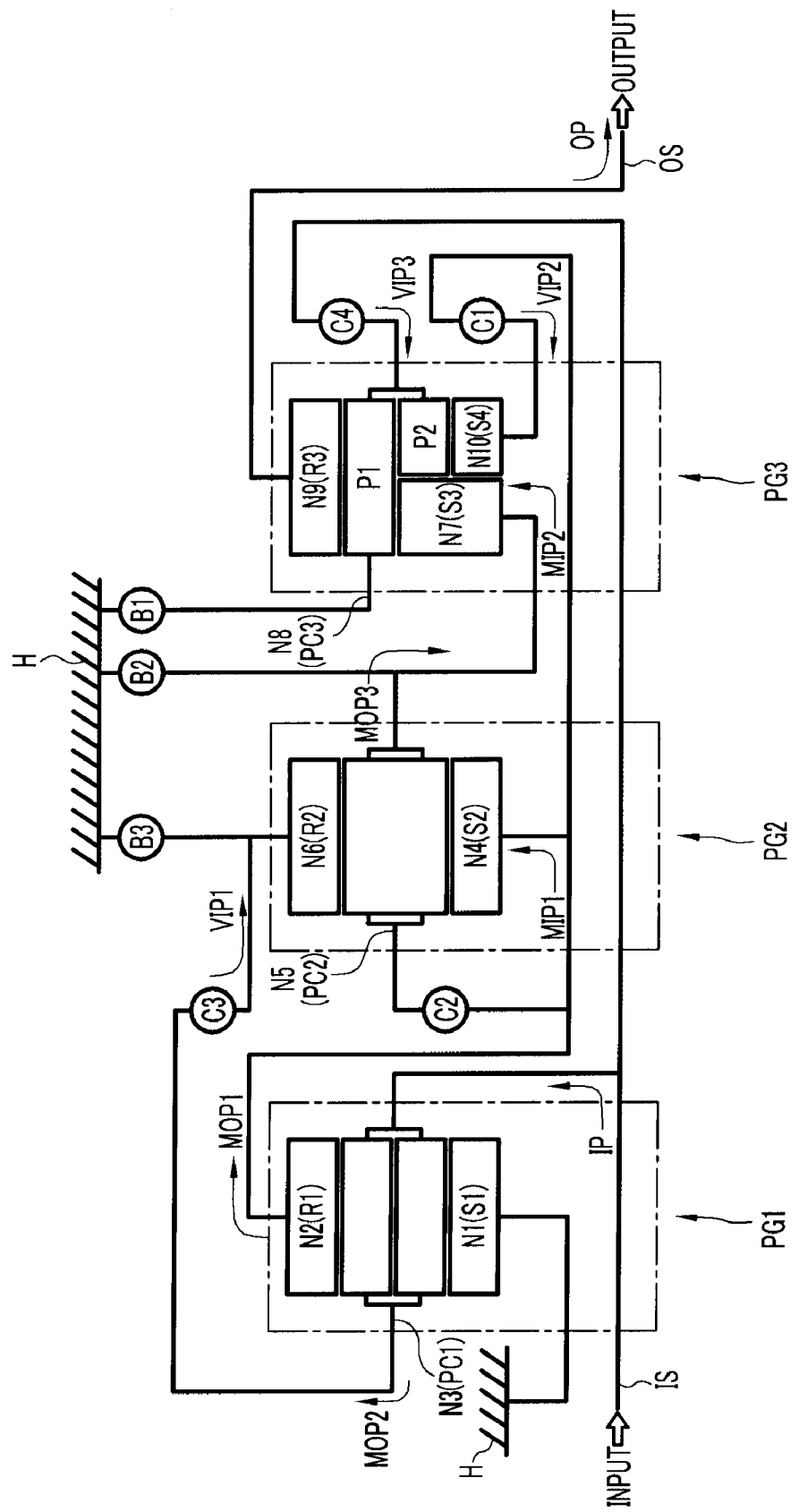
FIG. 4 is a schematic diagram of another exemplary gear train according to the present invention.
Figure 5:
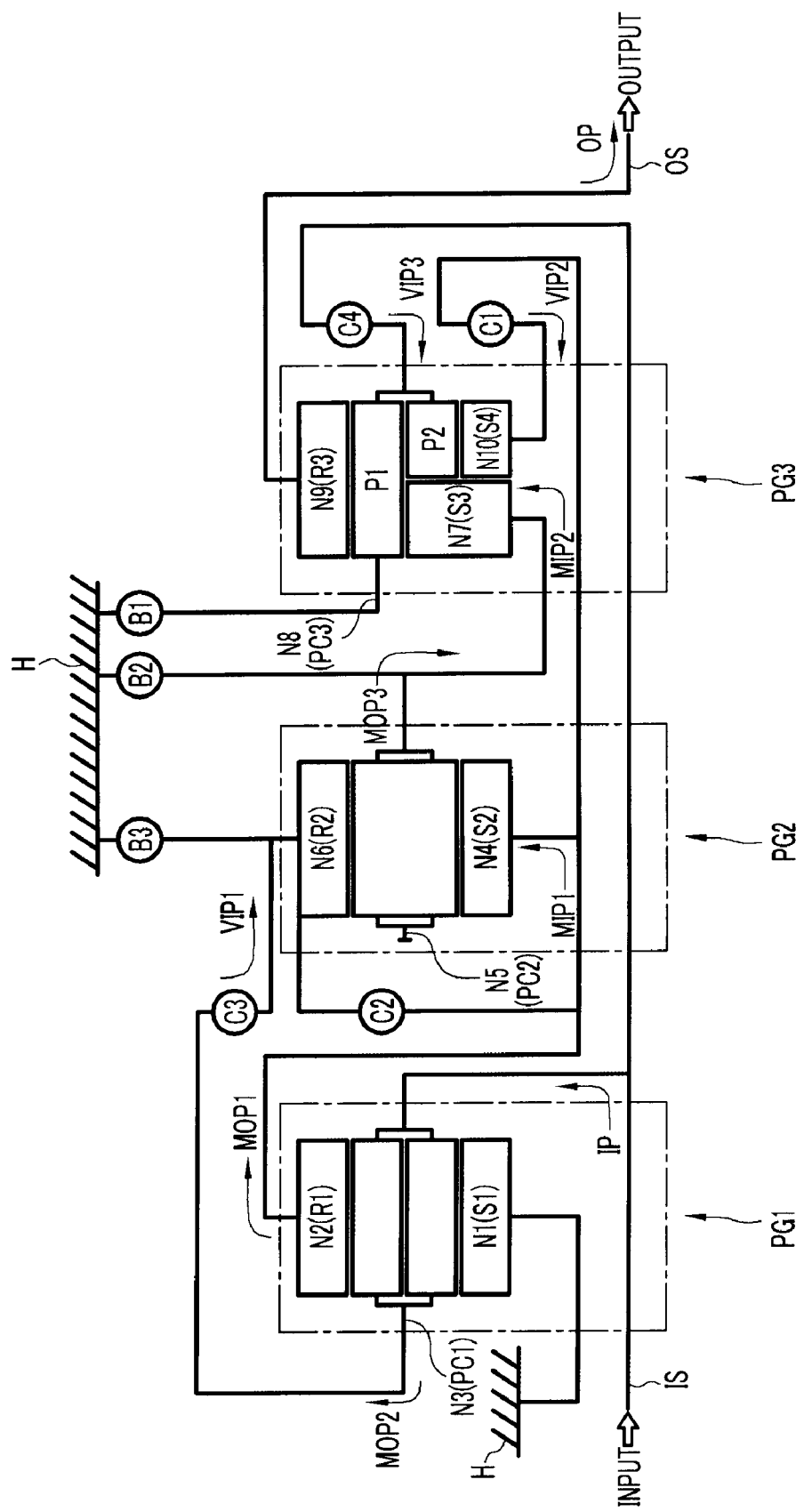
FIG. 5 is a schematic diagram of another exemplary gear train according to the present invention.

FIG. 4 to FIG. 9 show other exemplary embodiments of the present invention. According to various embodiments of the present invention, the second clutch C2 for direct-coupling of the second planetary gear set PG2 is disposed between the second ring gear R2 and the second planet carrier PC2, but according to other embodiments of the present invention, the second clutch C2 is disposed between the second planet carrier PC2 and the second sun gear S2 as shown in FIG. 4. In addition, according to the still further embodiments of the present invention, the second clutch C2 is disposed between the second ring gear R2 and the second sun gear S2 as shown in FIG. 5.

Figure 6:
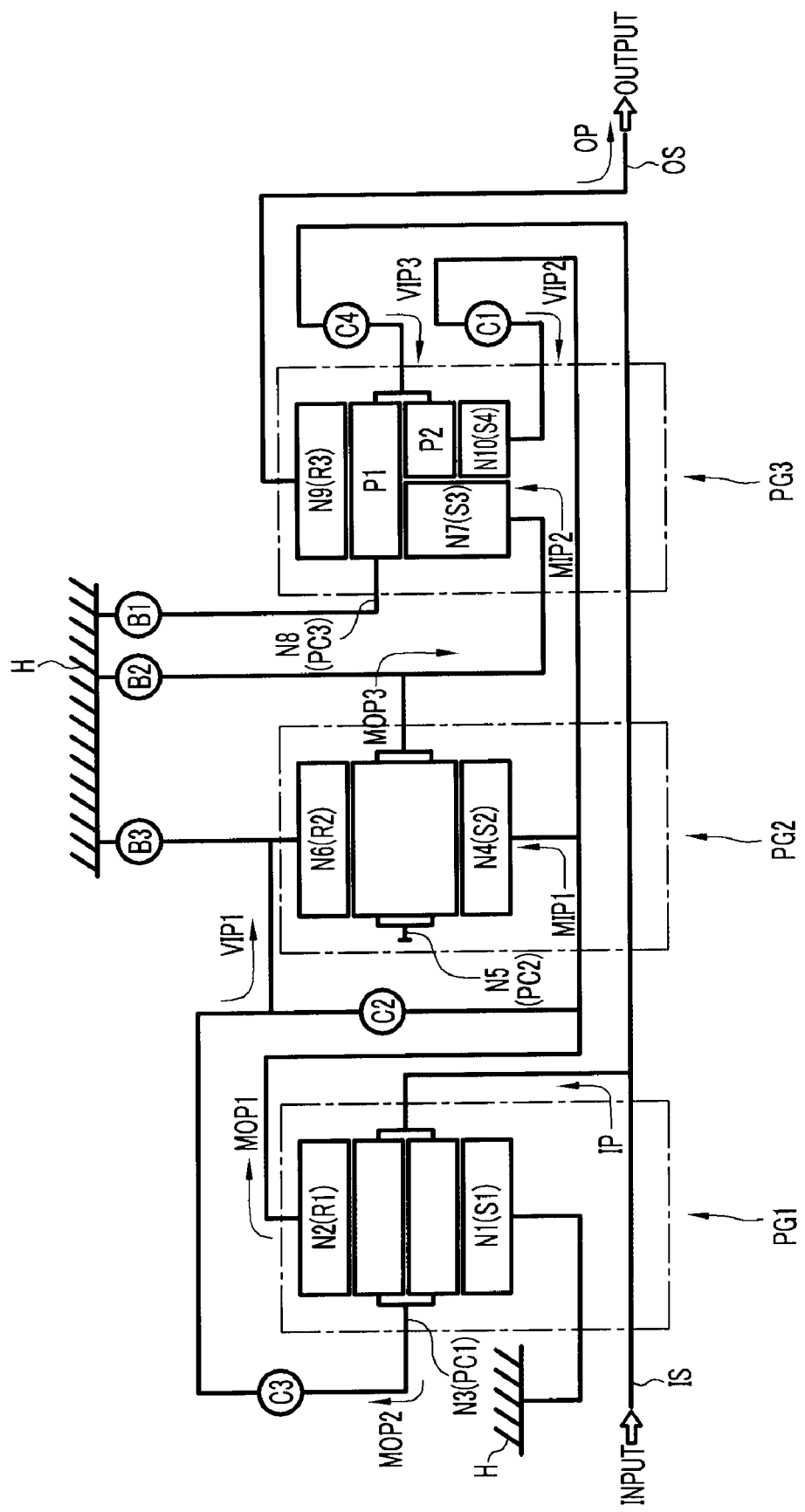
FIG. 6 is a schematic diagram of another exemplary gear train according to the present invention.
Figure 7:
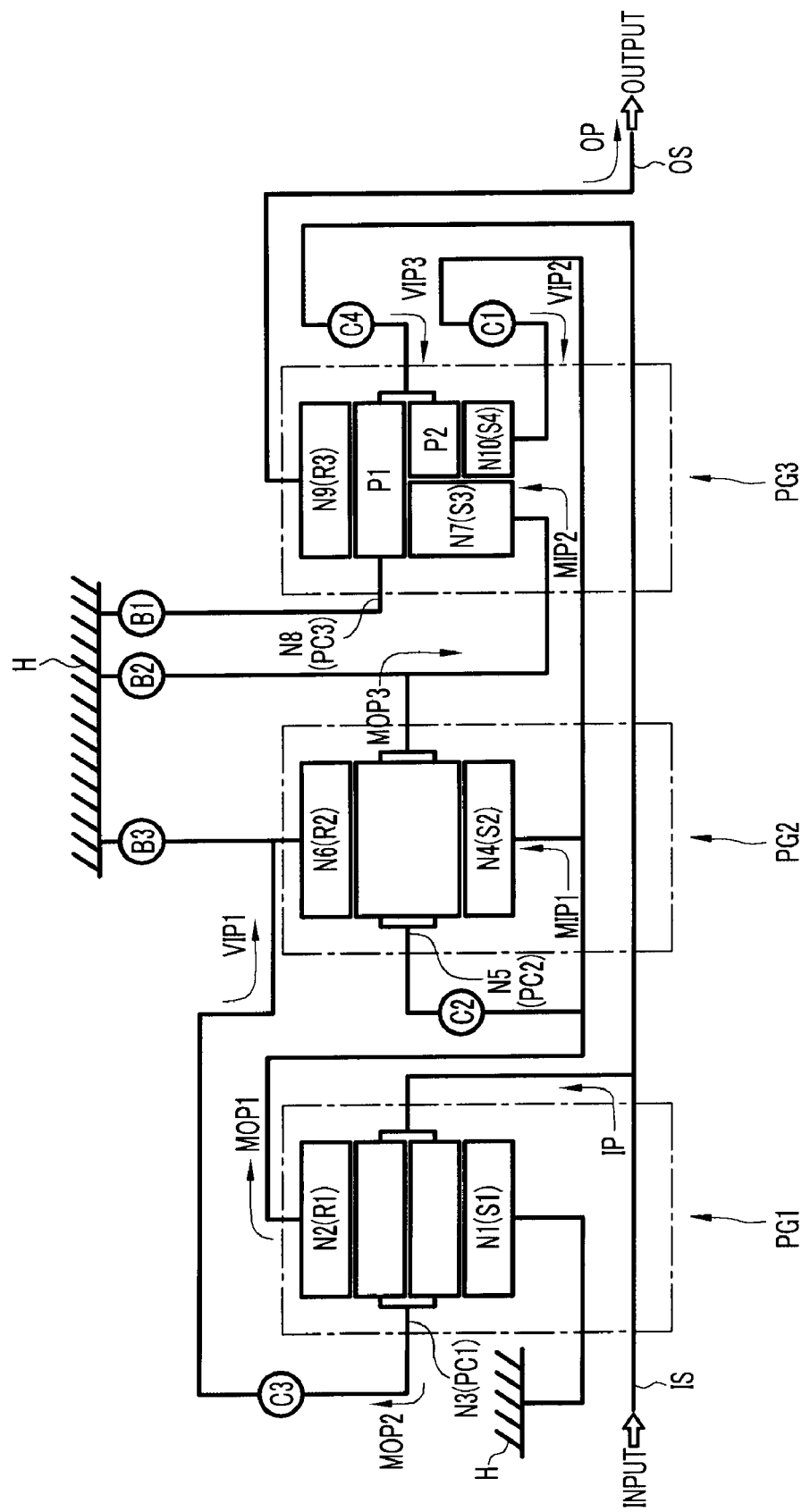
FIG. 7 is a schematic diagram of another exemplary gear train according to the present invention.
Figure 8:
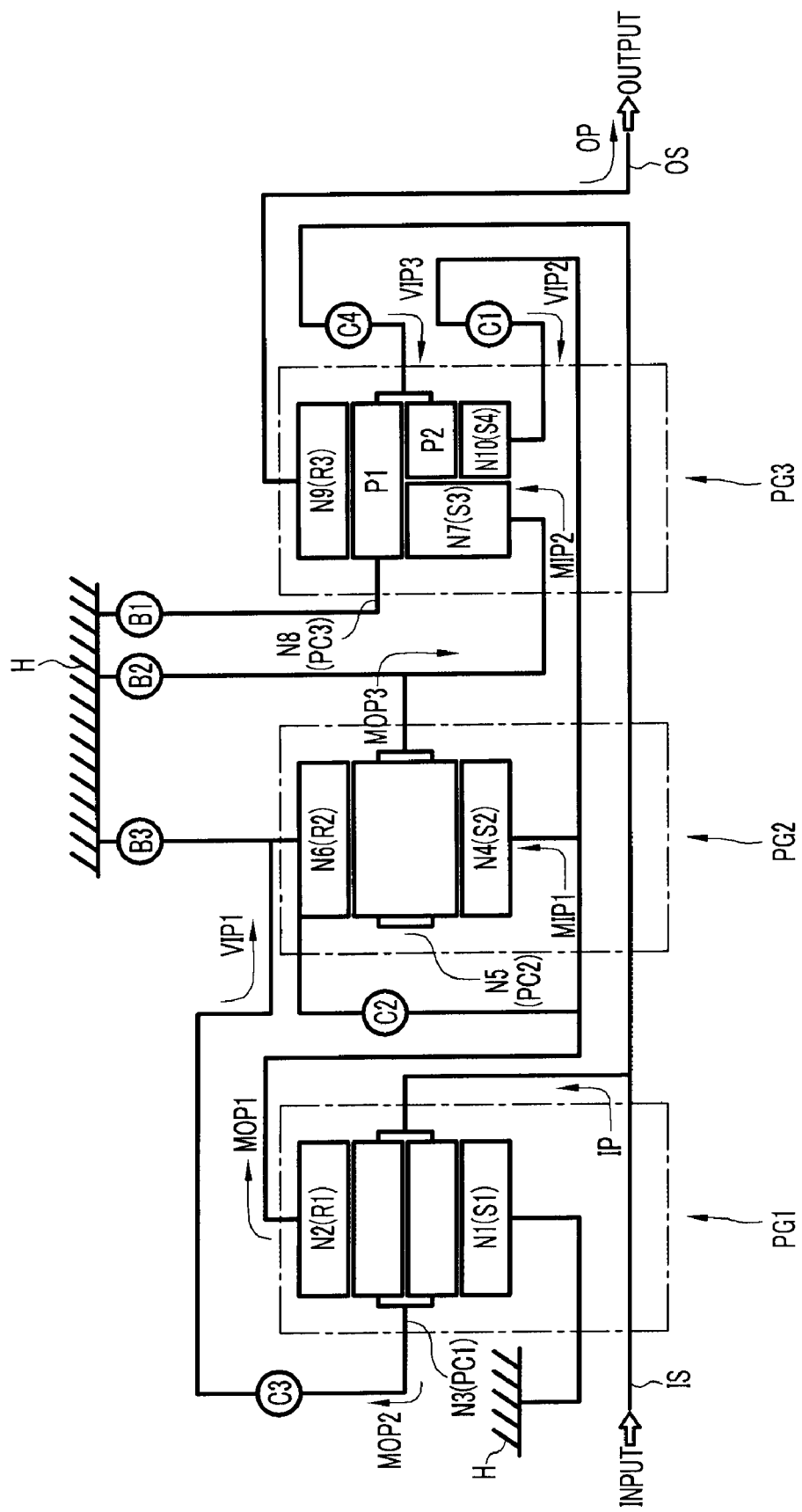
FIG. 8 is a schematic diagram of another exemplary gear train according to the present invention.

Structure of various embodiments of the present invention is similar to that of the above-described embodiment(s), but the third clutch C3 may disposed at the front portion of the first planetary gear set PG1, as shown in FIG. 6. Structure of other embodiments of the present invention is similar to that of the second exemplary embodiment, but the third clutch C3 is disposed at the front portion of the first planetary gear set PG1, as shown in FIG. 7. Structure of still other embodiments is similar to that described above, but the third clutch C3 is disposed at the front portion of the first planetary gear set PG1, as shown in FIG. 8.

Figure 9:
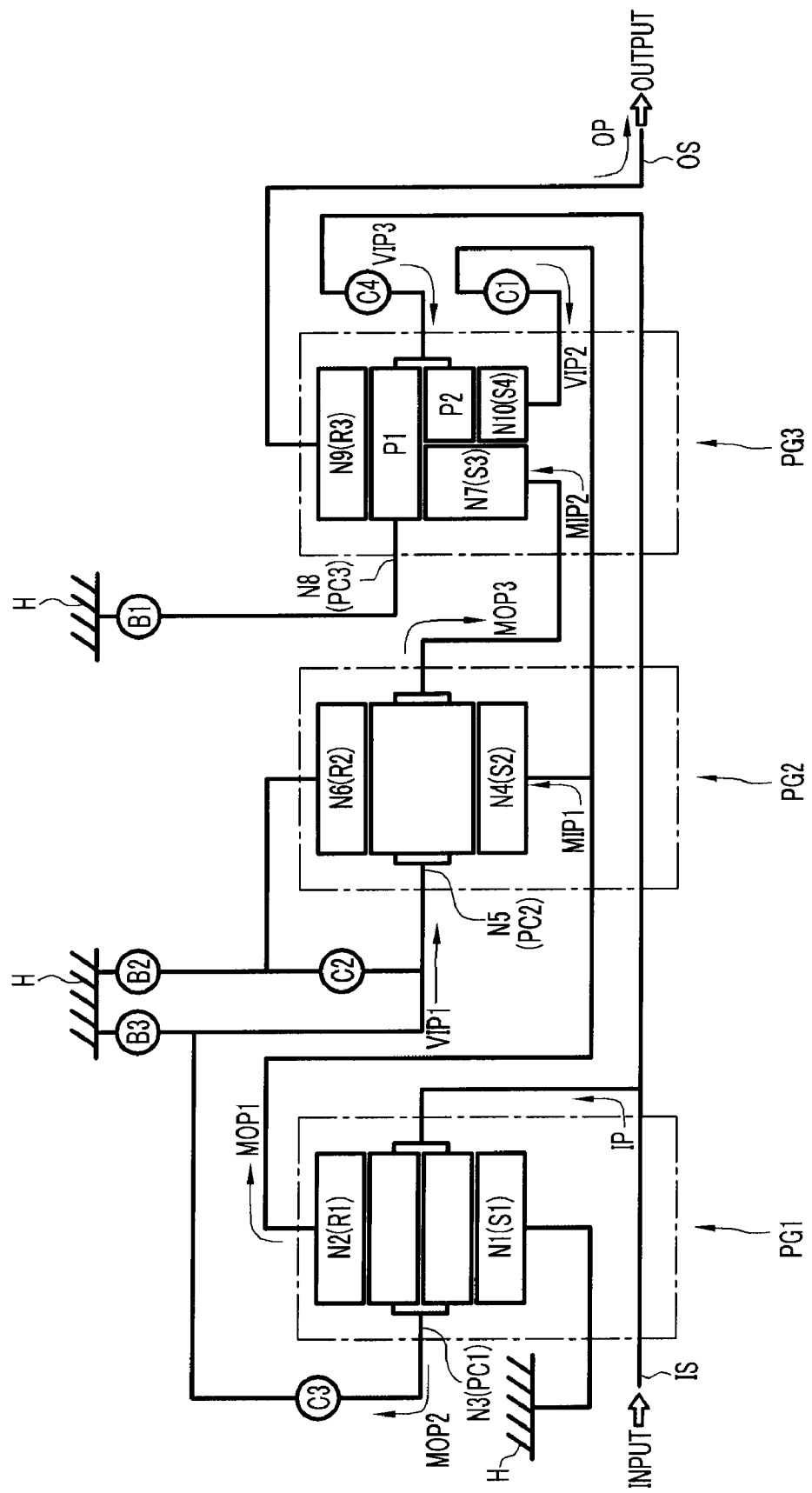
FIG. 9 is a schematic diagram of another exemplary gear train according to the present invention.

According to the exemplary embodiment of the present invention shown in FIG. 9, structure is similar to that of that described above except that the second planet carrier PC2 of the fifth rotation element N5 forms the first variable input pathway VIP1, the second ring gear R2 of the sixth rotation element N6 is selectively connected to the transmission housing H through the second brake B2, and the second planet carrier PC2 of the fifth rotation element N5 is selectively connected to the transmission housing H through the third brake B3.

Meanwhile, operations and shifting processes of various embodiments to the is similar to that of the first above-described embodiment, and thus detailed description will be omitted.

In addition, one would appreciate that a one-way clutch may be disposed in parallel with the first brake B1 such that the one-way clutch instead of the first brake B1 is operated at the first forward speed D1, and thus it may be included within the spirits of the present invention.

Since exemplary embodiments of the present invention realize ten forward speeds and three reverse speeds by combining the first and second planetary gear sets PG1 and PG2 of two simple planetary gear sets and the third planetary gear set PG3 of the compound planetary gear set with four clutches C1, C2, C3, and C4 and three brakes B1, B2, and B3 of the friction elements, power delivery performance and fuel mileage may be improved.

Since the plurality of friction elements are dispersed, formation of hydraulic lines may be simplified.

Since two friction elements are operated at each speed, capacity of a hydraulic pump may be reduced and control efficiency of hydraulic pressure may be enhanced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A gear train of an automatic transmission for vehicles comprising:
    a first planetary gear set comprising a first rotation element always operating as a fixed element, a second rotation element forming a first intermediate output pathway which always outputs a reduced rotation speed, and a third rotation element forming an input pathway which is connected to an input shaft and forming a second intermediate output pathway which outputs a rotation speed of the input shaft;
    a second planetary gear set comprising a fourth rotation element forming a first intermediate input pathway directly connected to the first intermediate output pathway, a fifth rotation element forming a third intermediate output pathway and operating as a selective fixed element, and a sixth rotation element operating as a selective fixed element, wherein two rotation elements of the fourth, fifth, and sixth rotation elements are selectively connected such that the second planetary gear set becomes a direct-coupling state, and one of the fifth and sixth rotation elements forms a first variable input pathway which is selectively connected to the second intermediate output pathway;
    a third planetary gear set configured to comprise seventh, eighth, ninth, and tenth rotation elements by combining two planetary gear sets, wherein the seventh rotation element forms a second intermediate input pathway which is directly connected to the third intermediate output pathway, the tenth rotation element forms a second variable input pathway which is selectively connected to the first intermediate output pathway, the eighth rotation element forms a third variable input pathway which is selectively connected to the input shaft and operates as a selective fixed element, and the ninth rotation element forms a final output pathway which is connected to an output shaft; and
    a friction member comprising a plurality of clutches disposed for selective connections of the first, second, and third variable input pathways and a selective direct-coupling of the second planetary gear set, and a plurality of brakes disposed between the rotation elements operating as the fixed element and a transmission housing.

2. The gear train of claim 1, wherein the first rotation element is fixed to the transmission housing.

3. The gear train of claim 1, wherein the friction member comprises:
    a first clutch disposed on the second variable input pathway;
    a second clutch disposed for the selective direct-coupling of the second planetary gear set;

a third clutch disposed on the first variable input pathway;
a fourth clutch disposed on the third variable input pathway;
a first brake selectively stopping the eighth rotation element;
a second brake selectively stopping one of the fifth rotation element and the sixth rotation element; and
a third brake selectively stopping the other of the fifth rotation element and the sixth rotation element.

4. The gear train of claim 3, wherein the first planetary gear set is a double pinion planetary gear set having a first sun gear of the first rotation element, a first ring gear of the second rotation element, and a first planet carrier of the third rotation element as rotation elements thereof,
wherein the second planetary gear set is a single pinion planetary gear set having a second sun gear of the fourth rotation element, a second planet carrier of the fifth rotation element, and a second ring gear of the sixth rotation element as rotation elements thereof, and
wherein the third planetary gear set is a Ravigneaux planetary gear set formed by combining a single pinion planetary gear set and a double pinion planetary gear set and sharing a ring gear and a planet carrier, and having a third sun gear of the seventh rotation element engaged with a long pinion, a third planet carrier of the eighth rotation element, a third ring gear of the ninth rotation element, and a fourth sun gear of the tenth rotation element engaged with a short pinion as rotation elements thereof.

5. The gear train of claim 4, wherein the fifth rotation element forms the first variable input pathway, the second brake selectively stops the sixth rotation element, and the third brake selectively stops the fifth rotation element.

6. The gear train of claim 5, wherein the second clutch is disposed between the fifth rotation element and the sixth rotation element.

7. The gear train of claim 5, wherein the second clutch is disposed between the fourth rotation element and the fifth rotation element.

8. The gear train of claim 5, wherein the second clutch is disposed between the fourth rotation element and the sixth rotation element.

9. The gear train of claim 5, wherein the third clutch is disposed at a front portion of the first planetary gear set, the second clutch and the second and third brakes are disposed between the first planetary gear set and the second planetary gear set, the first brake is disposed between the second planetary gear set and the third planetary gear set, and the first and fourth clutches are disposed at a rear portion of the third planetary gear set.

10. The gear train of claim 4, wherein the sixth rotation element forms the first variable input pathway, the second brake selectively stops the fifth rotation element, and the third brake selectively stops the sixth rotation element.

11. The gear train of claim 10, wherein the second clutch is disposed between the fifth rotation element and the sixth rotation element.

12. The gear train of claim 10, wherein the second clutch is disposed between the fourth rotation element and the fifth rotation element.

13. The gear train of claim 10, wherein the second clutch is disposed between the fourth rotation element and the sixth rotation element.

14. The gear train of claim 10, wherein the second and third clutch is disposed between the first planetary gear set and the second planetary gear set, the third brake is disposed at an external circumferential portion of the second planetary gear set, the first and second brakes are disposed between the second planetary gear set and the third planetary gear set, and the first and fourth clutches are disposed at a rear portion of the third planetary gear set.

15. The gear train of claim 10, wherein the third clutch is disposed at a front portion of the first planetary gear set, the second clutch is disposed between the first planetary gear set and the second planetary gear set, the third brake is disposed at an external circumferential portion of the second planetary gear set, the first and second brakes are disposed between the second planetary gear set and the third planetary gear set, and the first and fourth clutches are disposed at a rear portion of the third planetary gear set.

16. The gear train of claim 3, wherein the first clutch and the first brake are operated at a first forward speed,
the first clutch and the second brake are operated at a second forward speed,
the first clutch and the third brake are operated at a third forward speed,
the first and second clutches are operated at a fourth forward speed,
the first and third clutches are operated at a fifth forward speed,
the first and fourth clutches are operated at a sixth forward speed,
the third and fourth clutches are operated at a seventh forward speed,
the second and fourth clutches are operated at an eighth forward speed,
the fourth clutch and the third brake are operated at a ninth forward speed,
the fourth clutch and the second brake are operated at a tenth forward speed,
the first and third brakes are operated at a first reverse speed,
the second clutch and the first brake are operated at a second reverse speed, and
the third clutch and the first brake are operated at a third reverse speed.

* * * * *